May 25, 1965

R. R. DESAI ETAL 3,184,928

BEARING

Filed April 29, 1963

2 Sheets-Sheet 1

INVENTORS
Ramesh R. Desai
BY Leon Wallerstein Jr
Ralph Hammar
Attorney

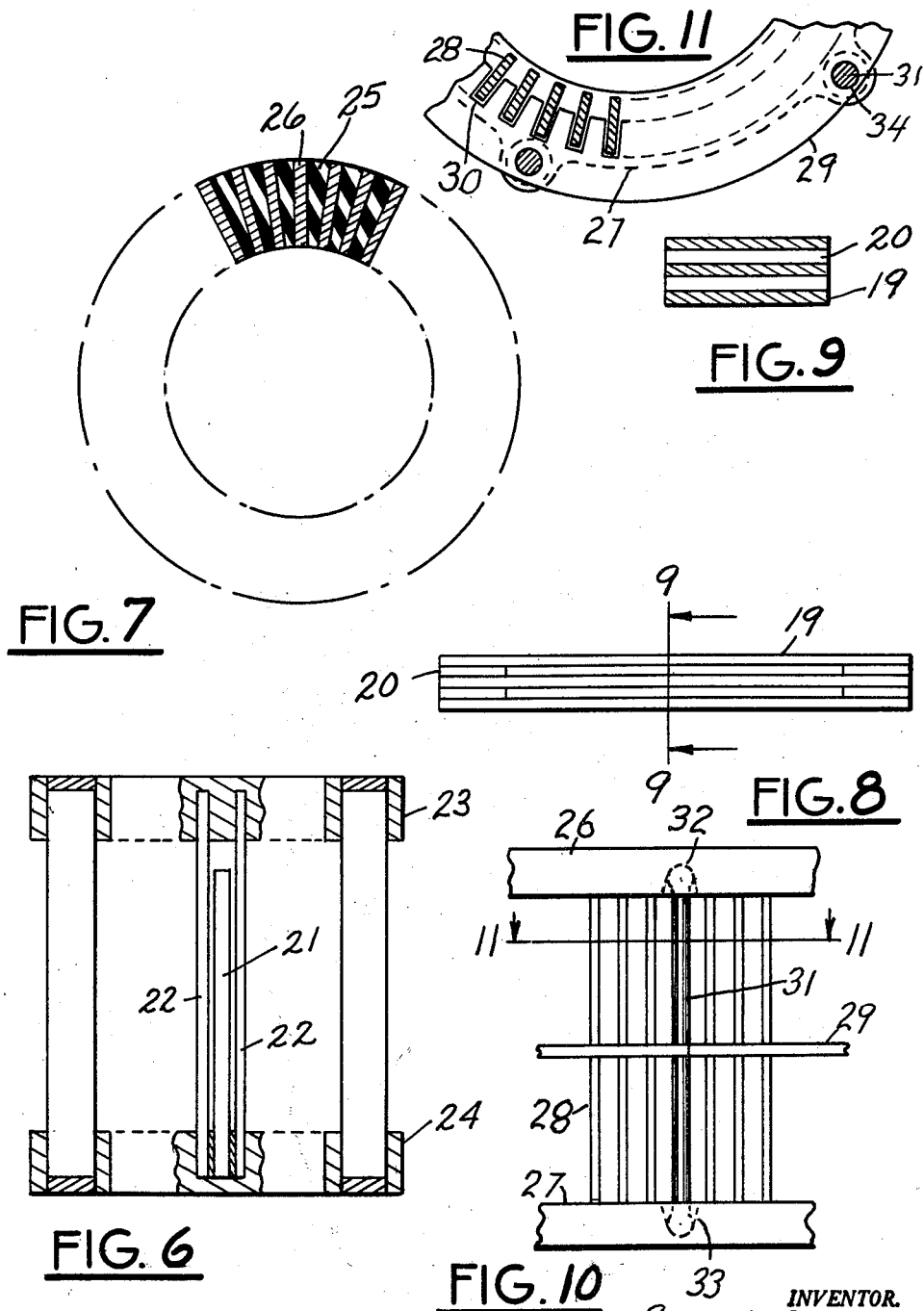

3,184,928
BEARING
Ramesh R. Desai and Leon Wallerstein, Jr., Erie, Pa., assignors to Lord Manufacturing Company, Erie, Pa., a corporation of Pennsylvania
Filed Apr. 29, 1963, Ser. No. 276,386
3 Claims. (Cl. 64—27)

This invention is a load carrying bearing using constrained end cantilevered beams or strips which are soft in directions perpendicular to the flat face of the strips and are stiff in other directions.

Figure 1:
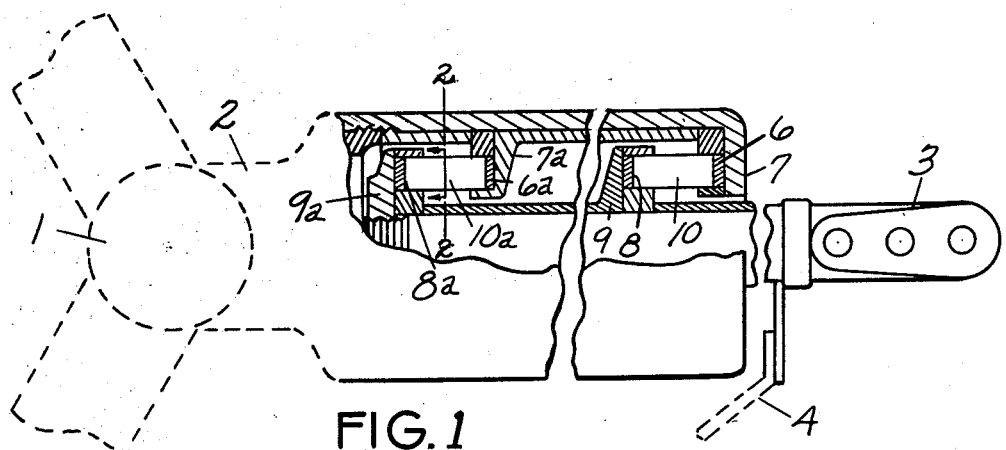
Figure 2:
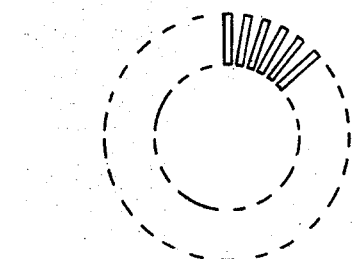
Figure 4:
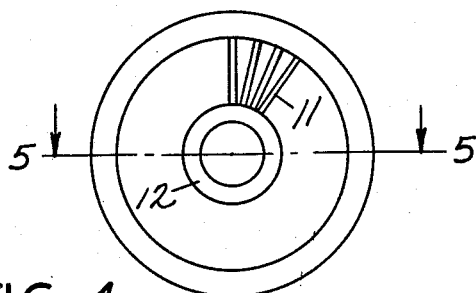
Figure 3:
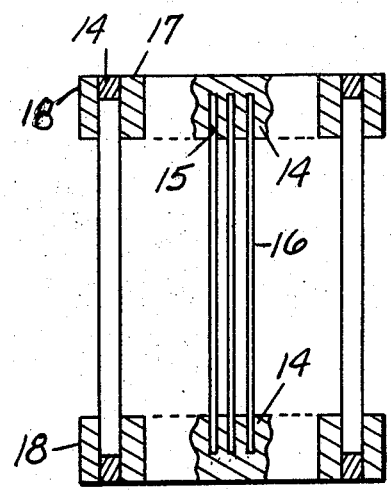
Figure 5:
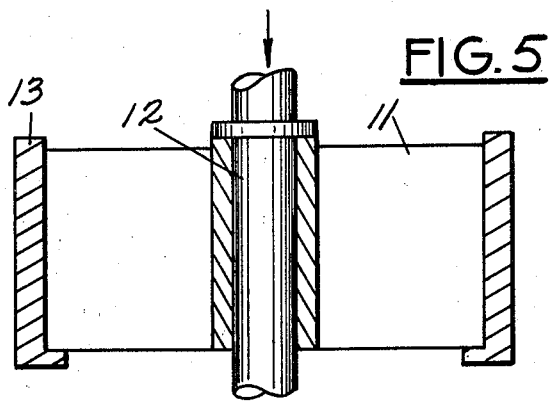

In the drawing, FIG. 1 is a radial section through a helicopter rotor equipped with a pitch change bearing, FIG. 2 is a section on line 2—2 of FIG. 1, FIG. 3 is a detail showing the fastening of the strips, FIG. 4 is an end view of a modification, FIG. 5 is a section on line 5—5 of FIG. 4, FIG. 6 is a view similar to FIG. 3 showing a relatively stiff cantilever between two adjacent strips for preventing buckling of the strips under compression, FIG. 7 is a fragmentary view showing an elastomer bonded between adjacent strips for preventing buckling, FIG. 8 is an edge view showing how thin strips may be bundled for ease of handling and attachment, FIG. 9 is a section on line 9—9 of FIG. 8, FIG. 10 is a diagrammatic edge view of another construction for increasing the compression load which can be carried without buckling, and FIG. 11 is a section on line 11—11 of FIG. 10.

The helicopter rotor hub 1 has a drive arm 2 for each blade 3. Associated with each blade is a pitch control mechanism 4 which rotates the blade about its longitudinal axis to change the pitch.

The connection between the blade and drive arm consists of two bearings or joints havings rings 6, 6a anchored to collars 7, 7a on the drive arm, rings 8, 8a anchored to collars 9, 9a on the blade and an array of beams or strips 10, 10a extending axially between and fixed at opposite ends to the rings 6, 6a and 8, 8a and lying in planes passing through the axis of the joint. From one aspect, the rings 6, 6a, 8 and 8a serve as load carrying parts. The strips 10, 10a are of structural material such as metal, fiberglass reinforced plastic, etc.

Centrifugal force of the blade loads the strips 10, 10a endwise in compression or in the direction in which the strips are essentially rigid. Rotation of the blade about its longitudinal axis by the pitch change mechanism 4 applies bending or torsion loads to the strips in the thickness direction in which the strips are least rigid. This provides the torsional softness desirable to permit easy change of the pitch of the blade. Loads in any direction radial to the longitudinal axis of the blades applies bending loads to the strips. Since the strips are stiff edgewise and soft in the thickness direction, the radial load is taken primarily by the strips which receive the load edgewise or nearly edgewise. In effect, half of the strips are loaded in the stiff edgewise direction and half in the soft thickness direction. The use of two bearings spaced along the drive arm maintains the blade centered on its longitudinal axis.

The relative stiffness of the bearing in the different directions may be varied. Decreasing the thickness of the strips decreases the rigidity in the torsional direction. Increasing the endwise load also decreases the rigidity in the torsional direction.

FIGS. 4 and 5 show a bearing in which strips 11 extend radially between an inner ring 12 and an outer ring 13. The strips also lie in planes passing through the axis of the joint. Radial forces are taken primarily in compression although there is some bending of the strips which are not in line with the radial force. Axial forces apply bending loads to the strips in the edgewise direction in which the strips are stiff. Torsional loads apply bending loads to the strips in the thickness direction in which the strips are quite soft. The FIGS. 4 and 5 bearing provides torsional softness but is stiff in both axial and radial directions.

FIG. 3 shows one way of anchoring the ends of the strips to the associated ring. As there shown, the inner ring 14 has slots 15 of length equal to the width of the strips 16 and of width equal to the thickness of the strips. At opposite ends of the slots are rings 17 and 18 which close the ends of the slots and provide an annular cavity for cement, solder or like fastening material which sets around the strips and provides a rigid connection anchoring the strips to the ring.

In a specific example of the bearing of FIGS. 1, 2 the strips were fiberglass reinforced plastic .050" thick, .75" wide and with a free length between the rings 6 and 8 of 1.80". These strips were arranged in an annular array having an inside diameter of 3.50" and an outside diameter of 5.00" and containing 178 strips. The axial load capacity was 40,000 lbs. and the radial load capacity was 10,000 lbs. The axial spring constant was 13,500,000 lbs./in.; the radial spring constant was 470,000 lbs./in.; and the torsional spring constant was 340 inch lbs./degree under no load reducing to 54 inch lbs./degree under axial load of 40,000 lbs.

In another specific example of the bearing of FIGS. 1 and 2, the strips 10 were of stainless steel .015" thick, .70" wide and having a free length between the rings of 1.50". The annular array had an inside diameter of 3.65" and an outside diameter of 5.05" and contained 400 strips. The axial load capacity was 20,000 lbs. and the radial load capacity was 36,000 lbs. The axial stiffness was 84,000,000 lbs./inch; the radial spring constant was 6,000,000 lbs./inch; and the torsional spring constant was 800 inch lbs./degree reducing to 230 inch lbs./degree under axial load of 5,000 lbs.

In both of the bearings illustrated, the axial and torsional loads are shared equally by the individual strips but radial loads are not equally shared because some of the strips are not in line with the radial load. If radial loads are expected in all directions, the strips should be spaced uniformly. If radial load is expected in only a few directions, the strips may be non uniformly spaced or bunched so a greater number of strips line up with the expected radial load. This non uniform spacing does not affect the axial and torsional loads so long as the strips are symmetrically disposed with respect to the axis of the bearing.

Preferably, the individual strips are spaced from each other so as to avoid friction. This spacing is obtained by the slotted construction illustrated in FIG. 3 but separate spacers may be used. To simplify assembly, bundles of individual strips may be fastened together at opposite ends with spacers between adjacent strips at the ends. These bundles or composite strips may be assembled into the bearing in the same manner as the individual strips, for example by the procedure of FIG. 3. When the bundle technique is applied to the joints of FIGS. 1 and 2 or FIGS. 5 and 6, some of the individual strips in the bundle will lie outside a plane passing through the axis of the bearing but with bundles of reasonable size, this deviation is not serious.

FIGS. 8 and 9 show one of the bundles. The strips 19 are separated at opposite ends by spacers 20. The bundle may then be assembled as a unit into one of the bearings.

The bearings of FIGS. 1, 2 and 3 are shown loaded in compression. The bearings could be loaded in tension. This would eliminate the tending of the strips to buckle and thereby increase the axial capacity and also make the bearings somewhat stiffer in torsion. The tendency of the strips to buckle under compression loads limits the axial capacity. This limitation is not present in tension loading. FIGS. 6 and 7 show expedients for delaying buckling of the strips and thereby increasing the axial load carrying capacity and the torsional stiffness. In FIG. 6, a cantilever 21 is interposed between two strips 22 of an annular array extending between load transmitting and load receiving members 23 and 24. The cantilever prevents or delays buckling of the strips but does not carry the axial load. In FIG. 7 bodies of elastomer 25 are bonded to and fill the spaces between adjacent strips 26 of an annular array to prevent buckling of the strips.

FIG. 10 shows a bearing with provisions for increasing the compression load which can be carried without buckling. In this view, the end rings 26, 27 are fixed to opposite ends of an annular array of axially extending strips 28. Midway between the end rings is a ring 29 having slots 30 for the strips 28. Struts 31 are pivoted at opposite ends in sockets 32, 33 in the rings 26, 27 and extend through holes 34 in the ring 29. The struts 31 are of large enough cross section to avoid buckling. As the bearing is subjected to torsional load moving the ring 26 angularly relative to the ring 27, the posts 31 and the ring 29 have the same angular movement and the slots 30 hold the central portion of the strips 28 in line with the ends of the strips. This prevents bulging of the central portions of the strips out of line with the ends to cause buckling. The ring 29 does not increase the torsional stiffness but it doubles the compression load which can be carried without buckling of the strips 28.

What is claimed as new is:

1. A load carrying bearing having spring characteristics in at least one direction comprising a load transmitting member, a load receiving member, two pairs of axially spaced load carrying parts in opposed relation to each other, one part of each pair being fixed to one member and the other part of each pair being fixed to the other member, an annular array of strips of structural material with the individual strips extending endwise between and fixed at opposite ends to the parts of each pair, the strips lying generally in planes through the axis of the bearings, said bearings holding the members in substantially fixed relation under loads endwise of the strips and radial to the axis of the bearing while providing a torsionally resilient connection between the members.

2. A load carrying bearing having spring characteristics in at least one direction comprising a load transmitting member, a load receiving member, and an array of strips of structural material having length, width and thickness, said strips extending endwise between and fixed at opposite ends to said members and sustaining the endwise load in compression in which the strips are essentially rigid, said strips being spaced from each other and flexing as cantilever beams under transverse loads and being soft to loads transverse to the thickness of the strip and less soft to loads edgewise of the strips, and bodies of elastomer bonded to and filling the spaces between adjacent strips of the array to prevent buckling of the strips under endwise loads.

3. A load carrying bearing having spring characteristics in at least one direction comprising a load transmitting member, a load receiving member, and an array of strips of structural material having length, width and thickness, said strips extending endwise between and fixed at opposite ends to said members and sustaining the endwise load in compression in which the strips are essentially rigid, said strips being spaced from each other and flexing as cantilever beams under transverse loads and being soft to loads transverse to the thickness of the strip and less soft to loads edgewise of the strips, an intermediate member with slots embracing the strips intermediate the ends of the strips, and rigid struts pivoted at opposite ends to said members and connected to said intermediate member.

References Cited by the Examiner
UNITED STATES PATENTS

| | | | |
|---|---|---|---|
| 2,379,175 | 6/45 | Mulheim. | |
| 2,694,319 | 11/54 | Johnson. | |
| 2,880,599 | 4/59 | Hlinsky | 64—27 |
| 3,060,334 | 10/62 | Favre. | |
| 3,081,991 | 3/63 | Swainson. | |
| 3,124,342 | 3/64 | Ormond. | |

FRANK SUSKO, *Primary Examiner.*